(12) United States Patent
Ignaczak et al.

(10) Patent No.: US 11,199,282 B2
(45) Date of Patent: Dec. 14, 2021

(54) FLUID LINE CONNECTOR AND ASSEMBLY WITH SECUREMENT DETECTION

(71) Applicant: Norma U.S. Holding LLC, Auburn Hills, MI (US)

(72) Inventors: Brian T. Ignaczak, Rochester, MI (US); René Schindler, Maintal (DE); Thomas A. Puvogel, Kalamazoo, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 0 days.

(21) Appl. No.: 16/404,551

(22) Filed: May 6, 2019

(65) Prior Publication Data

US 2019/0257456 A1    Aug. 22, 2019

Related U.S. Application Data

(63) Continuation-in-part of application No. 16/102,256, filed on Aug. 13, 2018, now Pat. No. 10,975,993.
(Continued)

(51) Int. Cl.
*F16L 37/133*     (2006.01)
*G06K 7/10*      (2006.01)
(Continued)

(52) U.S. Cl.
CPC ........ *F16L 37/133* (2013.01); *G06K 7/10366* (2013.01); *G06K 19/0716* (2013.01);
(Continued)

(58) Field of Classification Search
CPC .... G02B 6/3895; H04Q 1/138; H01R 13/465; G06K 19/07758; G06K 19/0717;
(Continued)

(56) References Cited

U.S. PATENT DOCUMENTS 5,511,827 A      4/1996  Steinkamp et al.
5,604,681 A  *  2/1997  Koeninger ............ B67D 7/348
                                                 700/285
(Continued)

FOREIGN PATENT DOCUMENTS

CN      102265078 A    11/2011
CN      205669645 U    11/2016
(Continued)

OTHER PUBLICATIONS

Russian Office Action for Application No. 2020109887 dated Jun. 3, 2020 (4 pages).
(Continued)

*Primary Examiner* — Brian E Miller
(74) *Attorney, Agent, or Firm* — Reising Ethington, P.C.

(57) ABSTRACT

A fluid line connector and assembly provides remote securement detection capabilities and is hence equipped for initial assembly, subsequent quality inspection, and subsequent service techniques that are automated, robotic, and/or autonomous. The fluid line connector includes a body, a radio-frequency identification (RFID) tag, one or more actuator members, and one or more switches. The body has a passage for fluid-flow therethrough. The RFID tag can communicate with an RFID interrogator. The actuator member(s) changes the state of the switch(es) when the actuator member(s) actuates. The switch(es) is electrically coupled with the RFID tag.

33 Claims, 6 Drawing Sheets

Related U.S. Application Data

(60) Provisional application No. 62/544,057, filed on Aug. 11, 2017.

(51) Int. Cl.
  *G06K 19/07* (2006.01)
  *G06K 19/077* (2006.01)

(52) U.S. Cl.
  CPC ... *G06K 19/0723* (2013.01); *G06K 19/07758* (2013.01); *F16L 2201/10* (2013.01)

(58) Field of Classification Search
  CPC .......... G06K 19/0723; G06K 19/07775; G06K 7/10366; F16L 37/0841; F16L 37/12; F16L 2201/10; F16L 37/144; H04W 4/80; H04L 67/12
  See application file for complete search history.

(56) References Cited

U.S. PATENT DOCUMENTS

| | | | |
|---|---|---|---|
| 5,682,662 A | 11/1997 | Coules et al. | |
| 6,443,747 B2 | 9/2002 | Saba | |
| 6,649,829 B2 * | 11/2003 | Garber | B67D 7/348 137/177 |
| 6,897,374 B2 | 5/2005 | Garber et al. | |
| 7,128,347 B2 | 10/2006 | Kerin | |
| 7,244,142 B2 | 7/2007 | Kato | |
| 7,394,375 B2 | 7/2008 | Johnson | |
| 7,458,400 B2 | 12/2008 | Weh et al. | |
| 7,647,954 B2 | 1/2010 | Garber et al. | |
| 7,841,357 B2 * | 11/2010 | Rankin | F16K 37/0041 137/1 |
| 7,954,374 B2 | 6/2011 | Rankin | |
| 8,373,961 B2 | 2/2013 | Kück et al. | |
| 8,393,646 B2 | 3/2013 | Galle et al. | |
| 8,401,777 B2 * | 3/2013 | Ryman | F16L 37/08 701/123 |
| 8,427,179 B2 | 4/2013 | Chamberlin | |
| 8,439,404 B2 | 5/2013 | Anton et al. | |
| 8,680,984 B2 | 3/2014 | Rosen | |
| 8,720,772 B2 | 5/2014 | Colman et al. | |
| 8,894,428 B2 | 11/2014 | Cecchinelli | |
| 9,188,267 B2 | 11/2015 | Fansler | |
| 9,469,410 B2 | 10/2016 | Peake | |
| 9,604,838 B2 | 3/2017 | Cornett et al. | |
| 9,744,321 B2 | 8/2017 | Tham et al. | |
| 9,886,679 B2 | 2/2018 | Bianco et al. | |
| 9,890,873 B2 | 2/2018 | Schwobe et al. | |
| 10,155,126 B2 | 12/2018 | Schwobe et al. | |
| 10,295,093 B2 | 5/2019 | Anton et al. | |
| 10,350,401 B2 * | 7/2019 | Ciccone | A61M 39/1011 |
| 10,741,103 B2 * | 8/2020 | Danielson | F16L 37/20 |
| 2003/0057700 A1 | 3/2003 | Endo | |
| 2004/0036273 A1 | 2/2004 | McClary | |
| 2006/0076419 A1 * | 4/2006 | Johnson | B67D 7/348 235/492 |
| 2007/0200723 A1 | 8/2007 | Newberg | |
| 2009/0066531 A1 | 3/2009 | Boubtane et al. | |
| 2010/0245057 A1 | 9/2010 | Chamarti et al. | |
| 2010/0326219 A1 | 12/2010 | Nelson et al. | |
| 2012/0247179 A1 | 10/2012 | Kerin et al. | |
| 2013/0284299 A1 | 10/2013 | Schooley et al. | |
| 2015/0000669 A1 | 1/2015 | Miller | |
| 2015/0192234 A1 | 7/2015 | Fries et al. | |
| 2015/0204752 A1 | 7/2015 | Miller | |
| 2016/0178101 A1 | 6/2016 | Blake et al. | |
| 2016/0229680 A1 | 8/2016 | Cornett et al. | |
| 2016/0298796 A1 | 10/2016 | Anton et al. | |
| 2017/0037991 A1 | 2/2017 | Danielson et al. | |
| 2017/0052079 A1 | 2/2017 | Clark | |
| 2017/0089496 A1 | 3/2017 | Lennon | |
| 2017/0224975 A1 | 8/2017 | Peer et al. | |
| 2018/0073670 A1 | 3/2018 | Wolfgang | |
| 2018/0245723 A1 | 8/2018 | Lazzari et al. | |
| 2018/0266602 A1 | 9/2018 | Fremont | |
| 2018/0340556 A1 | 11/2018 | Vriends et al. | |
| 2019/0049049 A1 | 2/2019 | Ignaczak et al. | |
| 2019/0071300 A1 | 3/2019 | Reinholdt | |
| 2019/0257456 A1 | 8/2019 | Ignaczak et al. | |
| 2020/0074260 A1 | 3/2020 | Puvogel et al. | |

FOREIGN PATENT DOCUMENTS

| | | |
|---|---|---|
| CN | 206929469 U | 1/2018 |
| CN | 107740893 A | 2/2018 |
| CN | 108317321 A | 7/2018 |
| DE | 3830475 A1 | 3/1990 |
| DE | 4336827 C1 | 1/1995 |
| DE | 202004002116 U1 | 6/2004 |
| DE | 102005029061 A1 | 1/2007 |
| DE | 102008008423 B4 | 4/2010 |
| DE | 102011088505 B4 | 3/2016 |
| DE | 102016003652 A1 | 10/2017 |
| DE | 102016205171 A1 | 10/2017 |
| EP | 0487844 B1 | 7/1994 |
| EP | 1762541 B1 | 1/2011 |
| EP | 2180224 B1 | 3/2014 |
| EP | 3276240 A1 | 1/2018 |
| EP | 3544114 A1 | 9/2019 |
| FR | 2983557 B1 | 5/2015 |
| GB | 2406887 B | 3/2007 |
| GB | 2564757 A | 1/2019 |
| JP | 3235064 B2 | 12/2001 |
| JP | 4198472 B2 | 12/2008 |
| JP | 2013534993 A | 9/2013 |
| JP | 2015512085 A | 4/2015 |
| JP | 2015513335 A | 5/2015 |
| KR | 950029654 A | 11/1995 |
| KR | 20080047134 A | 5/2008 |
| WO | WO02094707 A1 | 11/2002 |
| WO | WO2005078330 A1 | 8/2005 |
| WO | WO2007003770 A1 | 1/2007 |
| WO | WO2011003523 A1 | 1/2011 |
| WO | WO2011035987 A1 | 3/2011 |
| WO | WO2013131632 A1 | 9/2013 |
| WO | WO2018083287 A1 | 5/2018 |
| WO | WO2018104901 A1 | 6/2018 |
| WO | WO2018109233 A1 | 6/2018 |
| WO | WO2018172789 A1 | 9/2018 |

OTHER PUBLICATIONS

Russian Search Report for Application No. 2020109887 dated Jun. 3, 2020 (2 pages).
International Preliminary Report on Patentability for International Application No. PCT/US2018/046528 dated Feb. 11, 2020 (10 pages).
International Search Report and Written Opinion for International Application No. PCT/US2018/046528, dated Dec. 7, 2018; 14 pages.
Chinese Office Action for Chinese Application No. 201880051848.3 dated Mar. 30, 2021 (6 pages).
English Translation of Chinese Office Action for Chinese Application No. 201880051848.3 dated Mar. 30, 2021 (9 pages).
Chinese Search Report for Chinese Application No. 201880051848.3 dated Mar. 23, 2021 (2 pages).
Canadian Office Action for Canadian Application No. 3,072,465 dated Apr. 7, 2021 (4 pages).
Indian Office Action for Indian Application No. 202037009684 dated Jan. 1, 2021 (6 pages).
International Search Report for International Application No. PCT/US2020/058113 dated Feb. 18, 2021 (3 pages).
Written Opinion for International Application No. PCT/US2020/058113 dated Feb. 18, 2021 (5 pages).
Japanese Office Action for Japanese Application No. 2020-507683 dated Jun. 15, 2021 (5 pages).

(56) References Cited

OTHER PUBLICATIONS

Korean Office Action for Korean Application No. 10-2020-7007000 dated Aug. 3, 2021 (11 pages). Examiner notes this doc not in English.

* cited by examiner

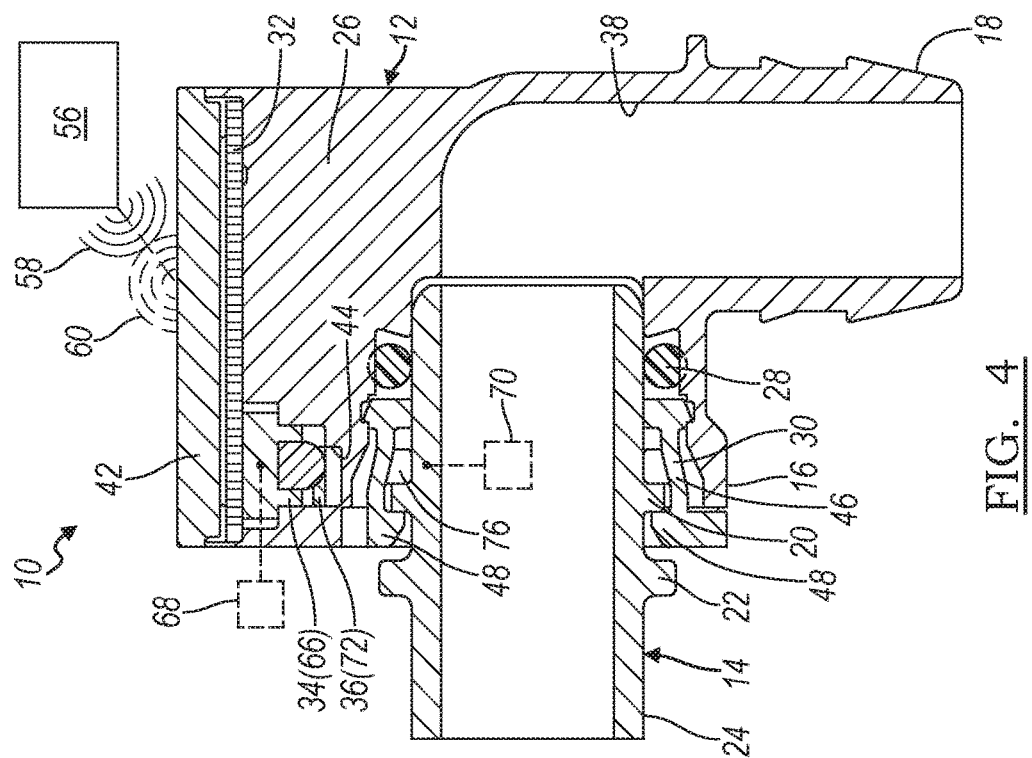
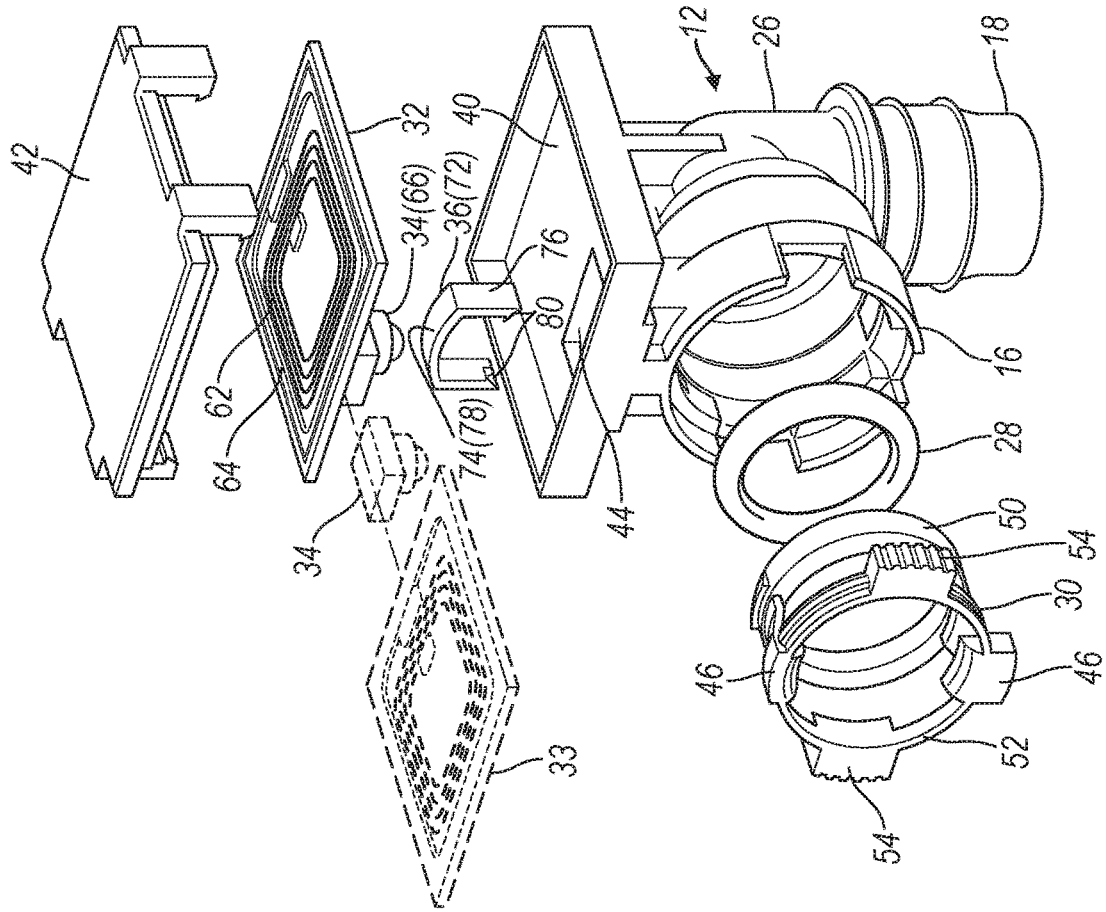
FIG. 3
FIG. 4

FLUID LINE CONNECTOR AND ASSEMBLY WITH SECUREMENT DETECTION

CROSS-REFERENCE TO RELATED APPLICATION

This application is a continuation-in-part of U.S. patent application Ser. No. 16/102,256, filed Aug. 13, 2018, which claims the benefit of U.S. Provisional Patent Application No. 62/544,057, filed Aug. 11, 2017.

TECHNICAL FIELD

This disclosure relates generally to connector assemblies used to join fluid lines together and, more particularly, to ways of detecting proper and full engagement of connector assembly members.

BACKGROUND

Connector assemblies, especially those with quick-connect functionality, are commonly used to join fluid lines together in vehicle applications. One example is coolant fluid lines in electric vehicle automobiles. For initial assembly and inspection and subsequent service, visual measures are sometimes employed in the design and construction of a connector assembly in order to verify that a proper and full engagement has been made between members of the connector assembly. Examples include secondary latches that are closable upon full engagement, and windows framed in one the members of the connector assembly for viewing engagement. These measures, as well as others like them, require physical interaction and viewing by the assembler, inspector, or servicer to ensure that a proper and full engagement has been made between the members of the connector assembly.

SUMMARY

In an embodiment, a fluid line connector may include a body, a radio-frequency identification (RFID) tag, an actuator member, and a switch. The body has a passage. The RFID tag is carried by the body. The actuator member is situated near the body's passage. The actuator member is acted upon when another connector is inserted into the fluid line connector. The switch is electrically coupled with the RFID tag. The switch is situated near the actuator member. The switch changes its state (i.e., from an open state to a closed state, or vice versa) upon insertion of the other connector into the fluid line connector.

In another embodiment, a fluid line connector may include a body, a radio-frequency identification (RFID) tag, a retainer, an actuator member, and a switch. The body has a passage. An opening resides in the body and leads to the passage. The RFID tag is carried by the body. The retainer can move in and out and through the opening. The actuator member is situated at a location that is near the retainer. The actuator member actuates when the retainer moves through the opening and when the retainer abuts the actuator member. The switch is electrically coupled with the RFID tag. The switch is situated at a location that is near the actuator member. The switch is impinged by the actuator member when the actuator member is actuated.

In yet another embodiment, a fluid line connector may include a body, a radio-frequency identification (RFID) tag, a retainer, a first actuator member, a first switch, a second actuator member, and a second switch. The body has a passage. The RFID tag is carried by the body. The retainer is carried by the body. The retainer can be received in a slot of another connector when the other connector is inserted into the fluid line connector. The first actuator member is situated near the body's passage. Amid insertion of the other connector into the fluid line connector, abutment from the other connector with the first actuator member actuates the first actuator member. The first switch is electrically coupled with the RFID tag. The first switch changes its state when the first actuator member is actuated. The second actuator member is situated at a location that is near the retainer. When the retainer moves in a direction that is transverse to a direction of insertion of the other connector into the fluid line connector, abutment from the retainer with the second actuator member actuates the second actuator member. The second switch is electrically coupled with the RFID tag. The second switch changes its state when the second actuator member actuates.

In yet another embodiment, a fluid line connector may include a body, a radio-frequency identification (RFID) tag, a retainer, an actuator member, and a switch. The body has a passage. The RFID tag is carried by the body. The retainer is carried by the body. The actuator member is situated near the retainer. The actuator member is actuated upon movement of the retainer in a direction that is transverse to a direction of insertion of another connector into the fluid line connector. The switch is electrically coupled with the RFID tag. The switch is situated near the actuator member. The switch changes its state when the actuator member is actuated.

BRIEF DESCRIPTION OF THE DRAWINGS

Embodiments of the disclosure are described with reference to the appended drawings, in which:

FIG. 3 is an exploded view of a fluid line connector of the fluid line connector assembly of FIG. 1;

FIG. 4 is a sectional view of the fluid line connector assembly of FIG. 1;

DETAILED DESCRIPTION

Several embodiments of a fluid line connector and assembly are detailed in this description. The connectors and assemblies are designed and constructed to enable detection of proper and full securement between connectors without the necessity of the secondary latches and windows of the past that required some level of physical interaction and viewing by an assembler, inspector, or servicer at the site of securement. Instead, the connectors and assemblies of this description are provided with means in which proper and full securement can be detected via a device that is located remote of an immediate site of securement of the connectors, and the device need not necessarily make physical contact with the site of securement for detection. In this way, the connectors and assemblies are equipped for initial assembly, subsequent quality inspection, and subsequent service techniques that are automated, robotic, and/or autonomous—those found, for instance, in advanced manufacturing facilities in automotive production. The connectors and assemblies hence could prove useful in many applications, such as when an immediate power supply is not readily available and not readily at-hand. This description presents the connectors and assemblies in the context of automotive fluid lines, such as coolant fluid lines in electric vehicle automobiles, but the connectors and assemblies have broader application and are suitable for use in aircraft fluid lines, marine fluid lines, agricultural fluid lines, as well as other fluid lines.

As used herein, the phrase "full securement" and its grammatical variations is used to refer to a state of securement in which a fluid-tight joint is established via the fluid line connector. Furthermore, unless otherwise specified, the terms radially, axially, and circumferentially, and their grammatical variations refer to directions with respect to the generally circular shape of the passage of the fluid line connector.

Figure 2:
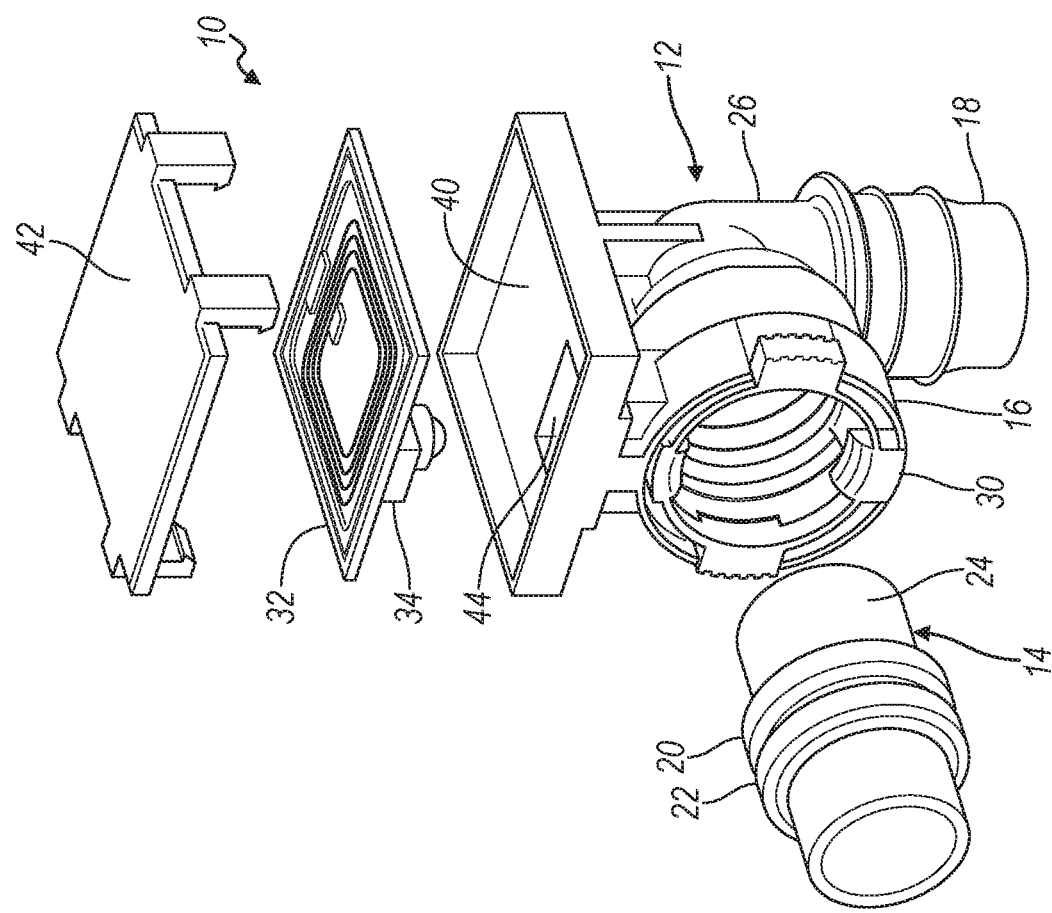
FIG. 2 is a partially exploded view of the fluid line connector assembly of FIG. 1.
Figure 1:
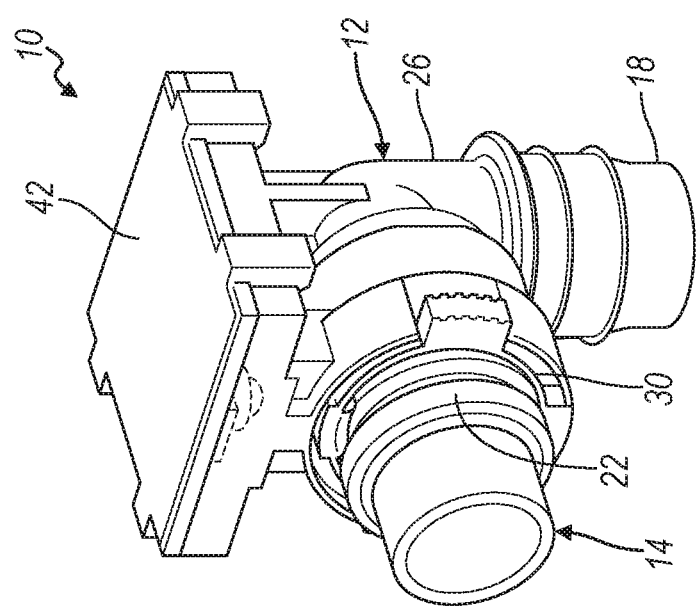
FIG. 1 is a perspective view of an embodiment of a fluid line connector assembly.

The fluid line connector and assembly can have various designs, constructions, and components in different embodiments, depending in some cases upon the application in which the fluid line connector and assembly are employed. FIGS. 1-4 present a first embodiment of a fluid line connector and assembly 10. The fluid line connector and assembly 10 here includes a fluid line connector 12 and another separate and discrete connector 14. The fluid line connector 12 has quick-connect functionality for ready connect and disconnect actions with the connector 14 and is used to join automotive fluid lines together. In this embodiment, the fluid line connector 12 is a female connector and the connector 14 is a male connector (often referred to as a spigot). The fluid line connector 12 receives insertion of the connector 14 at a first end 16 in installation, and couples to a fluid line at a second end 18. The fluid line connector 12 has an elbow and L-shaped configuration in the figures, but could have a straight and in-line configuration in other embodiments. The connector 14 could be an integral and somewhat monolithic part of a larger component such as a vehicle battery tray or heat exchanger, or could be an integral and somewhat monolithic part of a fluid line, among many possibilities. With particular reference to FIGS. 2 and 4, the connector 14 has a first flange 20 protruding radially-outboard of its body, and has a second flange 22 spaced axially from the first flange 20 and likewise protruding radially-outboard of the connector's body. The first and second flanges 20, 22 extend circumferentially around the connector 14. The connector 14 has an outer surface 24.

In this embodiment, the fluid line connector 12 includes a body 26, an o-ring 28, an insert 30, a radio-frequency identification (RFID) chip 32, a switch 34, and an actuator member 36; still, in other embodiments, the fluid line connector 12 can have more, less, and/or different components. Referring now to FIGS. 3 and 4, the body 26 has a passage 38 defined in its structure for allowing fluid-flow through the fluid line connector 12. The body 26 also has a compartment 40 for receipt and placement of the RFID chip 32. The compartment 40 is a space that is separate from the passage 38. A removable cover 42 can be provided to close the compartment 40 and enclose the RFID chip 32 therein. The body 26 further has a pass-through 44 for situating and seating the actuator member 36 within the body 26 in assembly. When the actuator member 36 is taken from the body 26 (for instance, as shown in FIG. 3), the passage 38 and compartment 40 communicate with each other by way of the pass-through 44 which is open to both of the passage 38 and compartment 40. The o-ring 28 is received within the passage 38, as perhaps depicted best by FIG. 4, and forms a seal thereat between the fluid line connector 12 and the connector 14. The insert 30 is also received within the passage 38 and is used to help retain the connector 14 when the connector 14 and fluid line connector 12 are secured together. In the example of the figures, the insert 30 has a pair of tangs 46 with hook ends 48 that capture the first flange 20 upon insertion of the connector 14 into the fluid line connector 12 to an appropriate overlapping depth, as demonstrated in FIG. 4. The insert 30 includes a first ring structure 50 and a second ring structure 52 that are bridged together by the tangs 46. Press-downs 54 on opposite sides of the second ring structure 52 can be squeezed to undo the captured first flange 20 for disassembling the connector 14 from the fluid line connector 12.

The RFID chip 32 assists in the detection of proper and full securement between the fluid line connector 12 and the connector 14. The RFID chip 32 transmits and receives radio frequency (RF) signals with an RFID interrogator 56. The RFID interrogator 56 sends an interrogating signal 58 to the RFID chip 32, which responds with an RF signal 60. In this way, proper and full securement detection is carried out with the use of RFID technologies. In a manufacturing facility, for instance, the RFID interrogator 56 can be stationed amid an assembly, inspection, and/or installation production line, and can establish an interrogation zone in which the RFID interrogator 56 seeks to intercommunicate with the RFID chip 32 as the fluid line connector and assembly 10 and larger application are transported through the securement zone. Depending on the manufacturing facility, the RFID interrogator 56 may establish an interrogation zone that spans several meters from the RFID interrogator 56. In another setting, the RFID interrogator 56 can be a mobile device such as a hand-held device. The RF signal 60 can convey various data and information to the RFID interrogator 56. In an embodiment, the information conveyed can be an indication of the state of securement between the fluid line connector 12 and the connector 14. For example, when the fluid line connector 12 and connector 14 exhibit full securement, the RF signal 60 can convey the fully secured information in the form of an ON signal to the RFID interrogator 56. The RFID interrogator 56 can in turn process the conveyed information. The information conveyed can also include a serial number, location of installation, etc.

With particular reference to FIGS. 3 and 4, the RFID chip 32 is carried by the body 26. Support between the RFID chip 32 and the body 26 can be effected in various ways. In this embodiment, the RFID chip 32 resides within the compartment 40 and is protected by the cover 42 in installation. At this location, the RFID chip 32 is shielded from exposure to fluid-flow traveling through the passage 38, and is shielded from external sources of contamination, depending on the particular application. The RFID chip 32 has an antenna 62 that exchanges (i.e., transmits and receives) RF signals, and has an integrated circuit (IC) 64 that stores data and information, among other possible functions.

The switch 34 interacts with the RFID chip 32 in order to activate and enable the RFID chip 32 to transmit and receive RF signals with the RFID interrogator 56, and in order to deactivate and disable the RFID chip 32 from transmitting and receiving RF signals. Still, the interaction can influence the functioning of the RFID chip 32 in other ways. In the embodiment presented by the figures, the switch 34 is electrically coupled with the RFID chip 32 to enable and disable the antenna 62 to and from transmitting and receiving RF signals. The switch 34 can have various designs, constructions, and components in different embodiments, depending in some cases upon the RFID chip that it interacts with and the design and construction of the accompanying connectors. For instance, the switch 34 can take mechanical, electrical, and magnetic forms. In one embodiment, and referring to FIGS. 3 and 4, the switch 34 is in the form of a button 66 mounted to the RFID chip 32. As demonstrated best by FIG. 4, the button 66 is located between the RFID chip 32 and the actuator member 36, and adjacent the pass-through 44. When impinged and physically pressed, the button 66—due to its electrical coupling to the RFID chip 32—activates and enables the antenna 62 to transmit and receive RF signals. A single press and release of the button 66 can activate the RFID chip 32, or a maintained impingement and pressing can activate the RFID chip 32 for the duration over which the impingement and pressing persists, depending on the embodiment. Conversely, a single press and release of the button 66 can deactivate the RFID chip 32, or an absence of a maintained impingement and pressing can deactivate the RFID chip 32 for the duration over which the impingement and pressing is lacking.

Furthermore, in other embodiments, the switch 34 can be prompted to activate and deactivate the RFID chip 32 by other means. With particular reference to FIG. 4, another embodiment carries out the prompting by use of a non-contact switch in lieu of a contact-based switch. A reed switch 68 is carried by the body 26 of the fluid line connector 12, and a magnetic component 70 is carried by the connector 14. Here, when the fluid line connector 12 and connector 14 are in full securement, the proximity between the reed switch 68 and magnetic component 70 prompts activation of the RFID chip 32. Conversely, less than full securement and the attendant remoteness of the reed switch 68 and the magnetic component 70 relative to each other deactivates the RFID chip 32. In this embodiment, the actuator member 36 need not be provided.

The actuator member 36 receives abutment amid full securement actions and at full securement between the fluid line connector 12 and the connector 14, and thereby prompts impingement of the switch 34. The actuator member 36 can have various designs, constructions, and components in different embodiments, depending in some cases upon the design and construction of the switch 34 and the accompanying connectors. In the embodiment of the figures, and referring now to FIGS. 3 and 4, the actuator member 36 spans between the passage 38 and the switch 34 to provide an interrelationship between the connector 14 and the RFID chip 32. The actuator member 36 is carried within the body 26 of the fluid line connector 12 and is situated and seated in the pass-through 44. At its location, the actuator member 36 has one end at the passage 38 and another end at the switch 34. In the embodiment of FIGS. 3 and 4, the actuator member 36 is in the form of a cam member 72. The cam member 72 is one-piece and has a U-shaped profile with a base portion 74 and a pair of prong portions 76 depending from the base portion 74. The base portion 74 has a first working surface 78 residing at the switch 34 and maintaining contact with the switch 34. And the prong portions 76 each have a second working surface 80 that reside in the passage 38 for abutment with the connector 14 upon its insertion into the fluid line connector 12. The second working surfaces 80 can be slanted relative to an axis of the connector 14 in order to ease abutment with the connector 14 and to induce the concomitant displacement of the cam member 72.

When the fluid line connector and assembly 10 is employed in use, proper and full securement can be detected via RFID technologies. The fluid line connector 12 and the connector 14 are brought together as the connector 14 is inserted into the body 26 at the first end 16. The first flange 20 comes into abutment with the cam member 72 and displaces the cam member 72 upward (relative to the orientation of the figures) and toward the button 66. The first flange 20 makes surface-to-surface abutment with the second working surfaces 80 of the cam member 72. The cam member 72 is urged upward and impinges the button 66 via surface-to-surface contact between the first working surface 78 and a confronting surface of the button 66. In this embodiment, the first flange 20 maintains abutment with the cam member 72 and the cam member 72 hence maintains impingement with the button 66 at full securement.

In another embodiment, the fluid line connector 12 includes more than a single RFID chip. With particular reference to FIG. 3, a second RFID chip 33 is provided in addition to the first RFID chip 32. And like the first RFID chip 32, the second RFID chip 33 assists in the detection of proper and full securement between the fluid line connector 12 and the connector 14. In this embodiment, both of the first and second RFID chips 32, 33 transmit and receive RF signals with the RFID interrogator 56. In an example, when the fluid line connector 12 and connector 14 exhibit full securement, the first RFID chip 32 can convey the fully secured information to the RFID interrogator 56. Conversely, when the fluid line connector 12 and connector 14 are not fully secured together, the second RFID chip 33 can convey this less-than fully secured information to the RFID interrogator 56. Further, at full securement, the second RFID chip 33 does not convey the less-than fully secured information to the RFID interrogator 56; and, when not fully secured together, the first RFID chip 32 does not convey the fully secured information to the RFID interrogator 56. As in the previous embodiment, the first and second RFID chips, 32, 33 can convey additional information such as a serial number, location of installation, etc. Whether the first RFID chip 32 conveys its fully secured information or the second RFID chip 33 conveys its less-than fully secured information is managed in part by the switch 34. In this embodiment, the switch 34 interacts with both of the first and second RFID chips 32, 33 and is electrically coupled to both of the first and second RFID chips 32, 33. The interaction and conveyance of information can be effected in different ways. For example, when impinged, the switch 34 can activate and enable the first RFID chip 32 to convey the fully secured information and, when not impinged, the switch 34 can activate and enable the second RFID chip 33 to convey the less-than fully secured information. The impingement and absence of impingement of the switch 34 can deactivate and disable the first RFID chip 32 or the second RFID chip 33.

With reference now to FIGS. 5-11, yet another embodiment of a fluid line connector and assembly 110 is presented. This embodiment has some similarities with the embodiment of FIGS. 1-4 and the similarities might not be repeated in the description of the embodiment of FIGS. 5-11. The fluid line connector and assembly 110 includes a fluid line connector 112 and another separate and discrete connector 114. The fluid line 112 has quick-connect functionality for ready connect and disconnect actions with the connector 114 and is used to join automotive fluid lines together, as well as other fluid lines in other applications. In this embodiment, the fluid line connector 112 is a female connector and the connector 114 is a male connector (often referred to as a spigot). The fluid line connector 112 receives insertion of the connector 114, as demonstrated best by FIG. 7. The fluid line connector 112 has an elbow and L-shaped configuration in the figures, but could have a straight and in-line configuration in other embodiments. The connector 114 could be an integral and somewhat monolithic part of a larger component such as a vehicle battery tray or heat exchanger, or could be an integral and somewhat monolithic part of a fluid line, among many possibilities.

Figure 6:
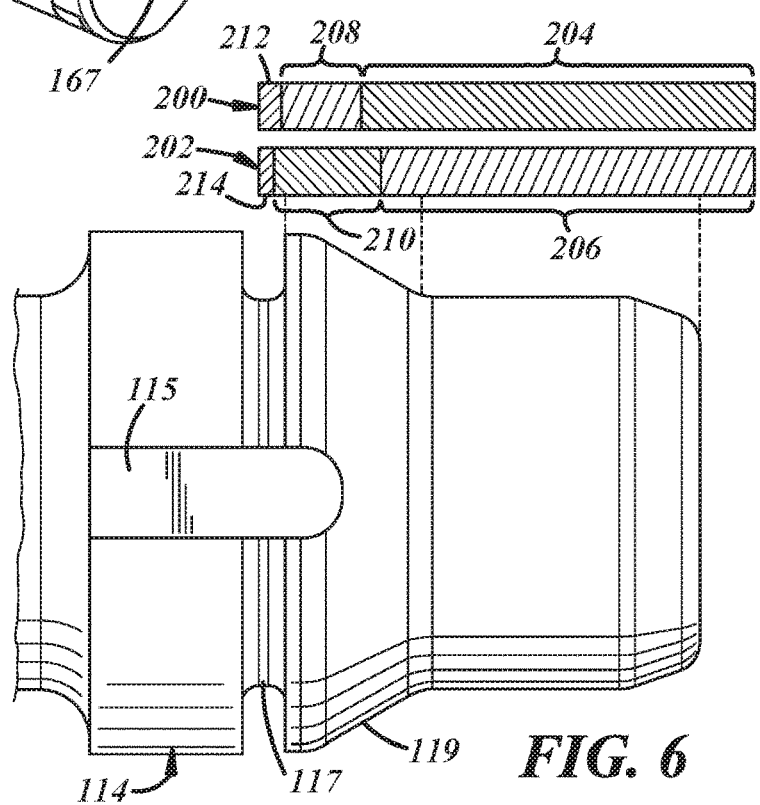
FIG. 6 is a side view of an embodiment of a connector that can be used with the fluid line connector of FIG. 5.

With particular reference to FIG. 6, the connector 114 has an extension 115 and a slot 117 located at an end of the connector 114 that is inserted into the fluid line connector 112. The extension 115 interacts with an actuator member of the fluid line connector 112, as set forth below, and can have various designs and constructions. The extension 115 spans axially over the inserted end of the connector 114, and protrudes radially-outboard of the connector's surrounding body. The slot 117 receives insertion of a retainer of the fluid line connector 112, as set forth below. The slot 117 spans circumferentially around the connector 114. Furthermore, the connector 114 has a ramp 119. The ramp 119 presents an increasing diameter in the connector 114. The connector 114 is inserted into the fluid line connector 112 with the ramp 119 received in the fluid line connector 112 before the extension 115 and before the slot 117 are received in the fluid line connector 112 (i.e., from right to left in the orientation of FIG. 6).

In the embodiment presented by FIGS. 5-11, the fluid line connector 112 includes a body 126, a retainer 129, a radio-frequency identification (RFID) tag 132, one or two switches 134, 135, and one or two actuator members 136, 137; still, in other embodiments, the fluid line connector 112 can have more, less, and/or different components. Turning now to FIGS. 5 and 7-9, the body 126 has a passage 138 defined in its structure for allowing fluid-flow through the fluid line connector 112. Further, the body 126 has a compartment for receipt and placement of the RFID tag 132. A removable cover 142 is provided to close the compartment and enclose the RFID tag 132 therein (the compartment and cover are only depicted in FIGS. 5 and 7, but the depiction of FIGS. 8 and 9 could have a similar construction for housing the RFID tag 132). Moreover, though only partially shown in FIG. 5, an insert assembly 143 can be provided and carried at the interior of the fluid line connector 112 and within the passage 138. Depending on its design and construction, the insert assembly 143 can facilitate fit, reception, and/or sealing between the fluid line connector 112 and the connector 114. The insert assembly 143, for instance, could include an o-ring 145 and a carrier 147, and could also include a bushing.

The body 126 has a construction that, in cooperation with the retainer 129, furnishes the quick-connect functionality of the fluid line connector 112. With reference again to FIGS. 5 and 7-9, a first opening 149 and a second opening 151 are defined on opposite sides of the body's wall and span all the way therethrough and lead to the passage 138. At the wall's exterior, a first recess 153 and a second recess 155 reside for temporarily deploying the retainer 129 as the retainer 129 is moved for receipt in the slot 117. Flanges 157 project radially-outboard of the body's wall and partially enclose sections of the retainer 129 to prevent inadvertent dislodging of the retainer 129 when it is received in the slot 117.

Furthermore, the body 126 has a structure intended to accommodate assembly and installation of the actuator member(s) 136, 137. The precise design and construction of that structure can vary, and can depend on the design and construction of the actuator member(s) and switch(es) utilized in the fluid line connector 112. In the embodiment presented by the figures, and turning now to FIGS. 5, 8, and 9, a first socket 159 and a second socket 161 reside in the body 126. The first socket 159 receives and holds the first actuator member 136 and is in the form of a slotted construction in this embodiment. The first socket 159 is located at an entrance 163 of the passage 138 for situating the first actuator member 136 thereat, and is defined in the body's wall near the entrance 163. To fully receive the first actuator member 136, an axial depth of the first socket 159 can be approximately equivalent to the length of the first actuator member 136. And, in a similar way, a radial width of the first socket 159 can be approximately equivalent to the width of the first actuator member 136. The axial depth of the first socket 159 is in general alignment with an axis of the passage 138 at the entrance 163. The figures depict an enlarged structure in the body's wall to accommodate the first actuator member 136 and for furnishing the first socket 159, but in other embodiments the accommodation can be more coherent and integrated into the body 126 such that the enlargement can be minimized.

Figure 9:
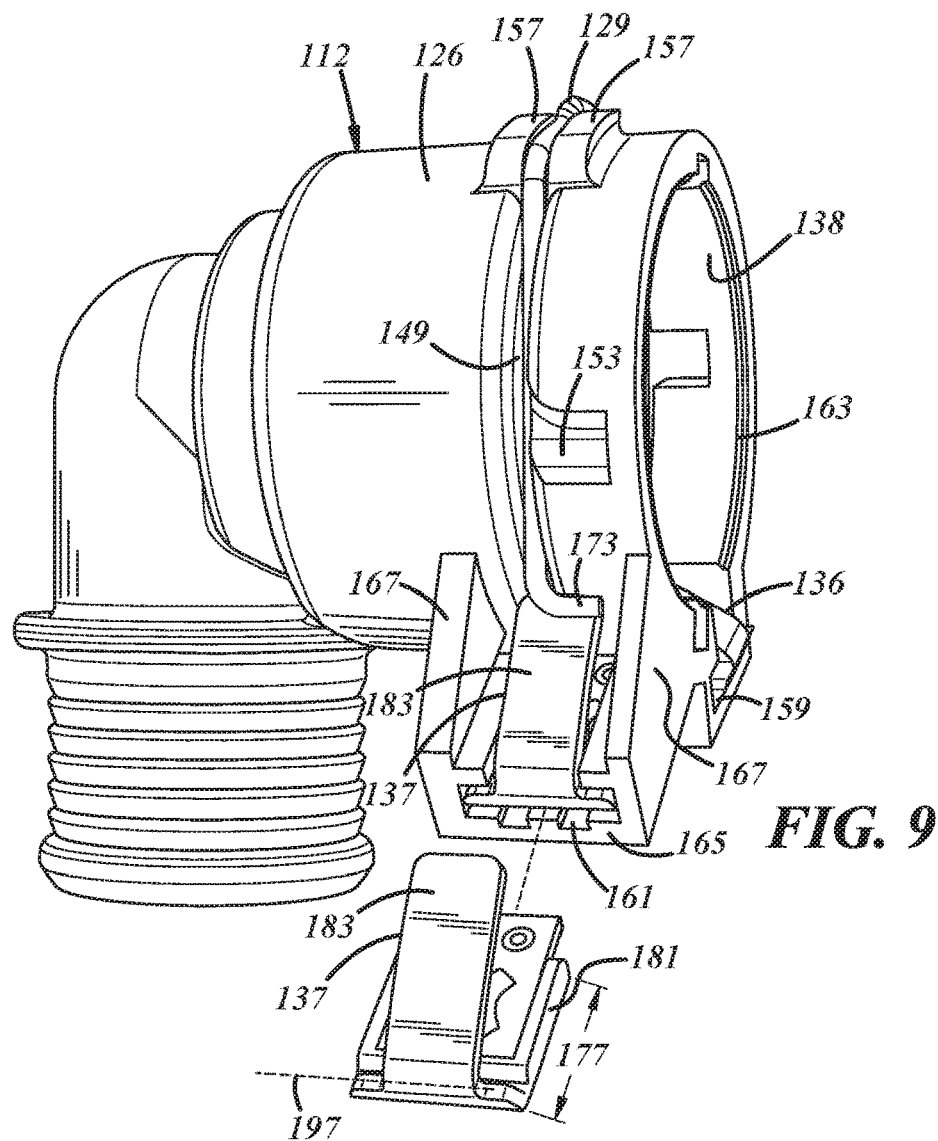
FIG. 9 is a side view of the fluid line connector of FIG. 5.

Referring now particularly to FIG. 9, the second socket 161 receives and holds the second actuator member 137 and is in the form of a slotted construction in this embodiment. The second socket 161 is located external of the passage 138 and at a side of the body's wall for situating the second actuator member 137 thereat. To fully receive the second actuator member 137, a radial depth of the second socket 161 can be approximately equivalent to the length of the second actuator member 137. And, in a similar way, an axial width of the second socket 161 can be approximately equivalent to the width of the second actuator member 137. The radial depth of the second socket 161 is in general alignment with a radius of the passage 138 at the entrance 163. The figures depict an enlarged structure projecting from the side of the body's wall to accommodate the second actuator member 137 and for furnishing the second socket 161, but in other embodiments the accommodation can be more coherent and integrated into the body 126 such that the enlarged structure can be minimized. In FIG. 9, a base wall 165 and a pair of side walls 167 depending from the base wall 165 together partially enclose the second actuator member 137 and help protect against inadvertent contact from foreign components when the fluid line connector 112 is put to use.

Figure 5:
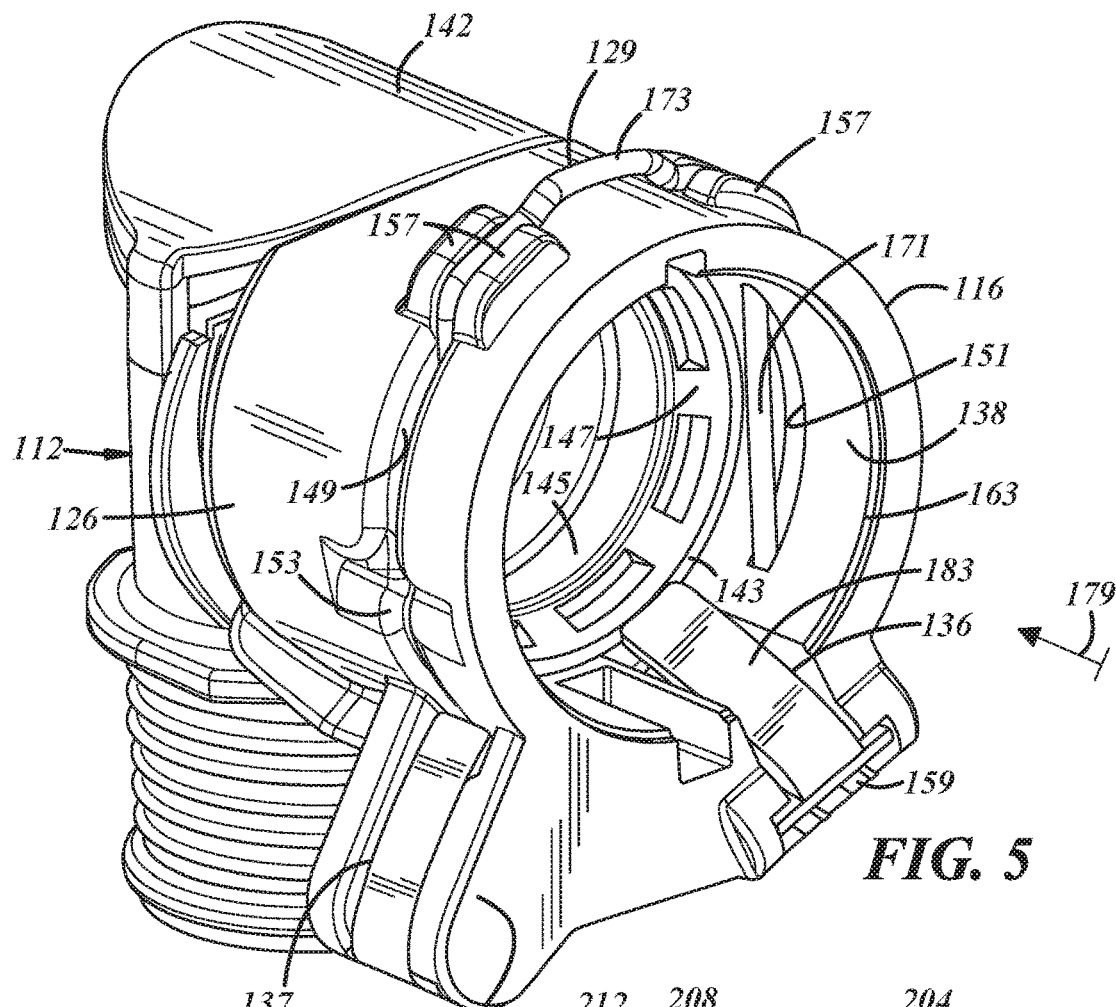
FIG. 5 is a perspective view of another embodiment of a fluid line connector.
Figure 8:
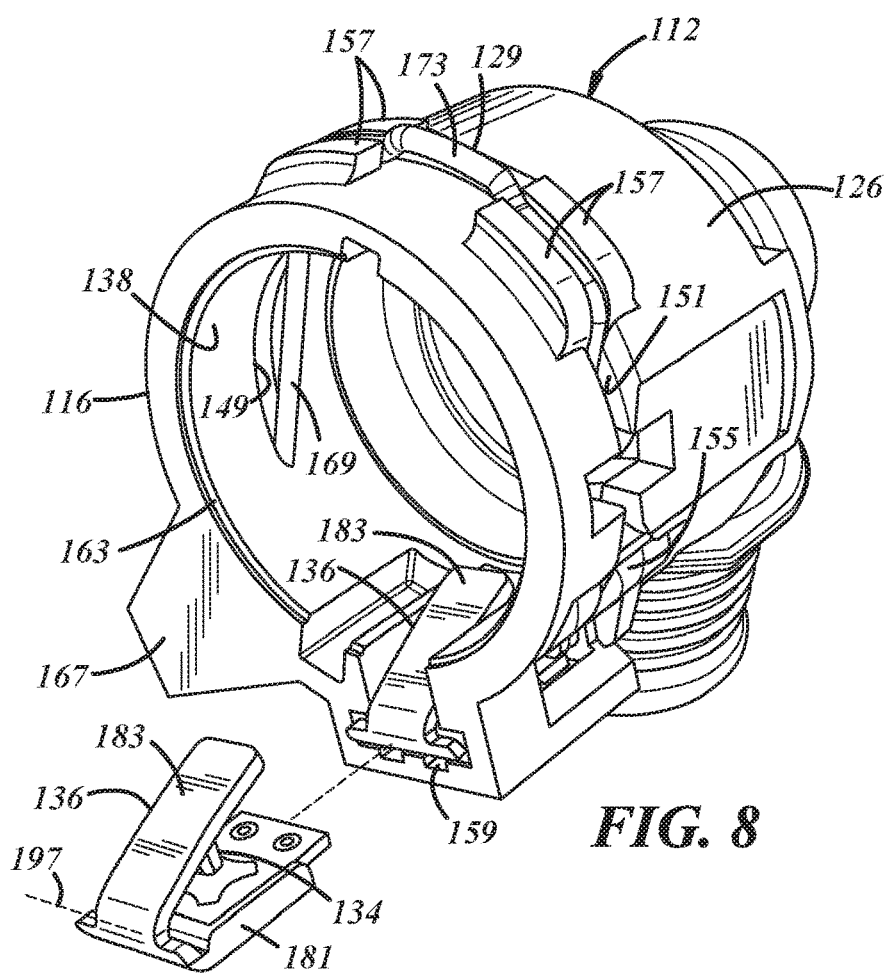
FIG. 8 is yet another perspective view of the fluid line connector of FIG. 5.

The retainer 129 interacts with the body 126 to furnish the quick-connect functionality of the fluid line connector 112 so that the connector 114 can be readily inserted into and held in the fluid line connector 112 and can be released and removed therefrom as needed or as desired. The retainer 129 can vary in design and construction. With particular reference to FIGS. 5 and 8, in this embodiment the retainer 129 is a one-piece stainless steel wire spring that is inwardly biased. The retainer 129 has a first leg 169, a second leg 171, and bridge 173 spanning between the legs. The first and second legs 169, 171 can be substantially similar in shape and size. A first position of use of the retainer 129 is presented in FIGS. 5, 8, and 9. In the first position of use, the retainer 129 is carried by the body 126 with the first and second legs 169, 171 moved through the first and second openings 149, 151. The first and second legs 169, 171 reside partially within the passage 138. The connector 114 is not inserted into the fluid line connector 112 in the first position of use. A second position of use of the retainer 129 lacks specific depiction in the figures. In the second position of use, the connector 114 is inserted into the fluid line connector 112 and the ramp 119 engages the first and second legs 169, 171. The engagement urges the first and second legs 169, 171 to spread apart away from each other (i.e., radially-outboard) and can move the bridge 173 radially-outboard. In some instances, a terminal foot 173 (FIG. 9) of the first leg 169 is seated in the first recess 153 and, likewise, a terminal foot (not specifically depicted) of the second leg 171 is seated in the second recess 155. As insertion of the connector 114 continues, the retainer 129 is brought to a third position of use in which the retainer 129 is received in the slot 117. The first and second legs 169, 171 ride over the ramp 119 and can snap back into their location of the first position of use, but are now received in the slot 117. The first and second legs 169, 171 are moved respectively through the first and second openings 149, 151. Receipt of the first and second legs 169, 171 into the slot 117 secures the fluid line connector 112 and the connector 114 together. Movement of the retainer 129 between its first and second and third positions of use moves the retainer 129 in a direction that is generally transverse and orthogonal to a direction of insertion 179 (FIG. 5) of the connector 114 into the fluid line connector 112—in other words, the retainer's movement is radially-outboard and radially-inboard, or up and down.

Figure 7:
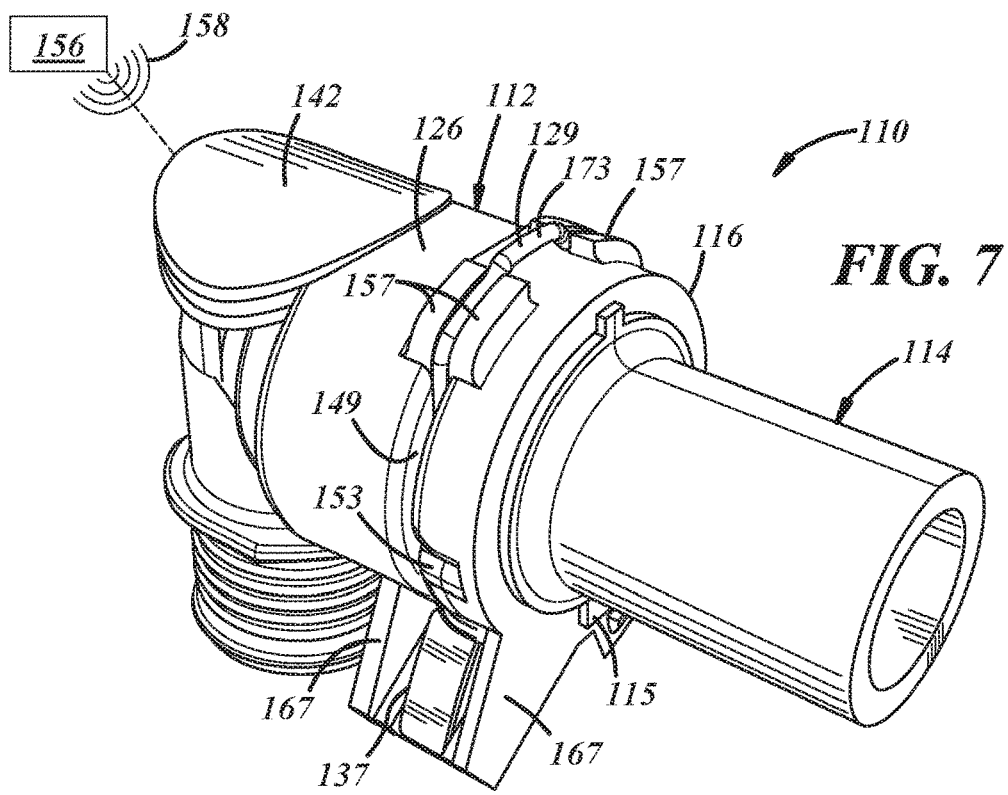
FIG. 7 is another perspective view of the fluid line connector of FIG. 5, with a connector assembled thereto.
Figure 11:
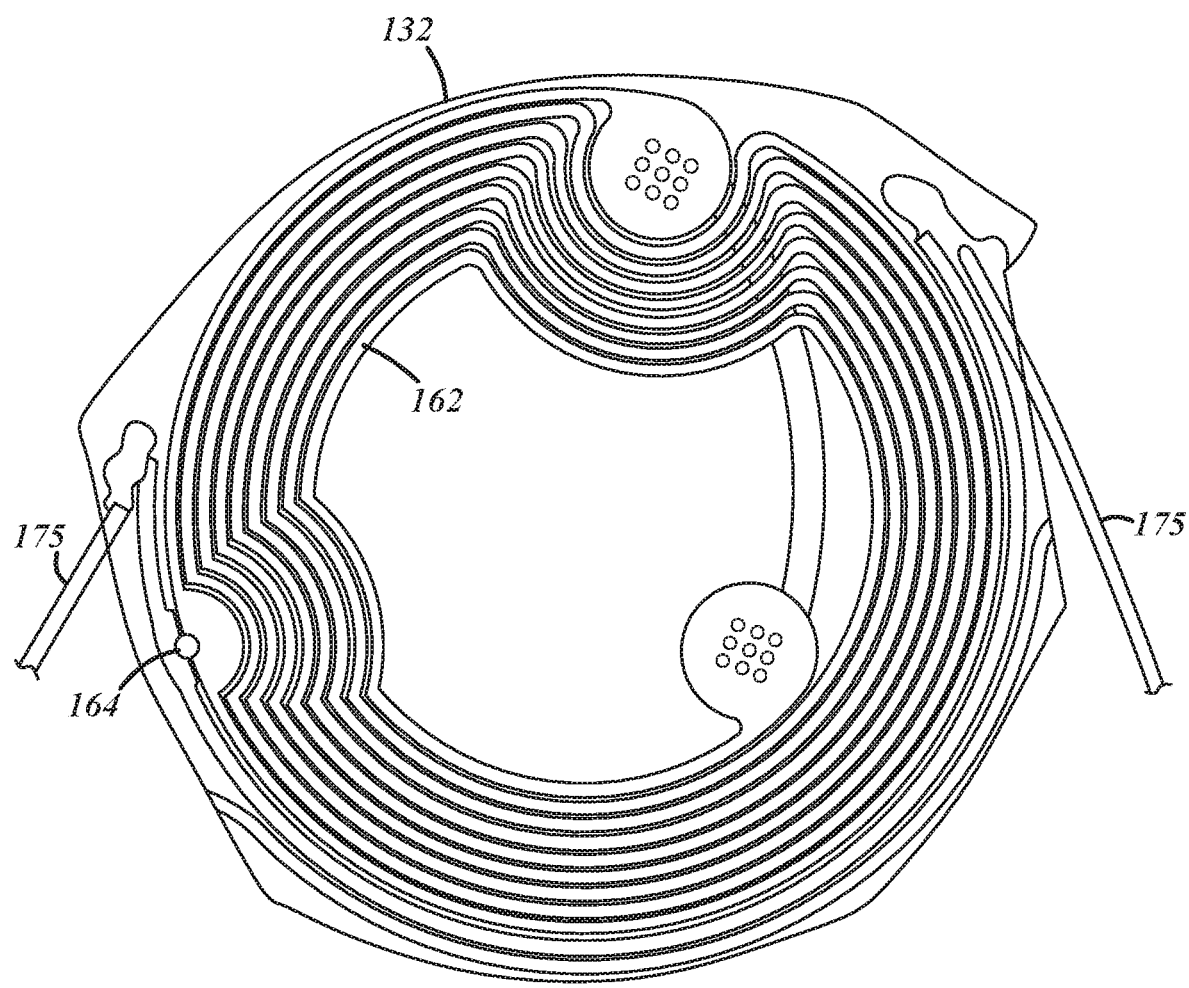
FIG. 11 is a top view of an embodiment of a radio-frequency identification (RFID) tag that can be used with the fluid line connector of FIG. 5.

Turning now to FIG. 11, the RFID tag 132 assists in the detection of proper and full securement between the fluid line connector 112 and the connector 114. The RFID tag 132 communicates with an RFID interrogator or reader 156 (FIG. 7). The RFID interrogator 156 sends an interrogating signal 158 to the RFID tag 132, which communicates in turn with the RFID interrogator 156. In this way, proper and full securement detection is carried out with the use of RFID technologies. In a manufacturing facility, for instance, the RFID interrogator 156 can be stationed amid an assembly, inspection, and/or installation production line, and can establish an interrogation zone in which the RFID interrogator 156 seeks to intercommunicate with the RFID tag 132 as the fluid line connector and assembly 110 and larger application are transported through the securement zone. Depending on the manufacturing facility, the RFID interrogator 156 may establish an interrogation zone that spans several meters from the RFID interrogator 156. In another setting, the RFID interrogator 156 can be a mobile device such as a hand-held device.

The RFID tag 132 is of the passive RFID tag type in this embodiment, but could be of another type such as an active RFID tag. The communications received from the RFID tag 132 can convey various data and information to the RFID interrogator 156. In an embodiment, the information conveyed can be an indication of the state of securement between the fluid line connector 112 and the connector 114. For example, when the fluid line connector 112 and connector 114 exhibit full securement, the RFID tag 132 can convey the fully secured information in the form of an ON signal to the RFID interrogator 156. And conversely, when the fluid line connector 112 and connector 114 lack full securement, the RFID tag 132 can convey the not-fully-secured information in the form of an OFF signal to the RFID interrogator 156. The RFID interrogator 156 can in turn process the conveyed information. The information conveyed can also include a part serial number, location of installation, etc. In an embodiment in which the fluid line connector 112 is equipped with both of the switches 134, 135 and both of the actuator members 136, 137, the RFID tag 132 can convey the state of each of the actuator members 136, 137 based upon impingement or non-impingement of the switches 134, 135. For example, the RFID tag 132 can convey one or more of the following: i) both of the actuator members 136, 137 lack actuation and hence both of the first and second switches 134, 135 are in an open state, ii) the first actuator member 136 lacks actuation and hence the first switch 134 is in an open state and the second actuator member 137 is actuated and hence the second switch 135 is in a closed state, iii) the first actuator member 136 is actuated and hence the first switch 134 is in a closed state and the second actuator member 137 lacks actuation and hence the second switch 135 is in an open state, and/or iv) both of the first and second actuator members 136, 137 are actuated and hence both of the first and second switches 134, 135 are in a closed state.

The RFID tag 132 is carried by the body 126. Support between the RFID tag 132 and the body 126 can be effected in various ways. In this embodiment, the RFID tag 132 resides within the body's compartment and is protected by the cover 142 in installation. At this location, the RFID tag 132 is shielded from exposure to fluid-flow traveling through the passage 138, and is shielded from external sources of contamination, depending on the particular application. As shown in FIG. 11, the RFID tag 132 has an antenna 162 and has an integrated circuit (IC) 164 that stores data and information, among other possible functions. The antenna 162 and IC 164 can be carried on a substrate of the RFID tag 132. When both are provided, the first and second switches 134, 135 can be electrically coupled with the RFID tag 132 in a series arrangement. Furthermore, as previously described with reference to FIG. 3, in the embodiment of FIGS. 5-11 the fluid line connector 112 can include more than a single RFID tag.

In alternatives to the embodiment of FIGS. 5-11, the fluid line connector 112 can be equipped with: i) only the first switch 134 and first actuator member 136, ii) only the second switch 135 and second actuator member 137, or iii) both of the first and second switches 134, 135 and both of the first and second actuator members 136, 137. The third [iii)] alternative is depicted in the figures, but skilled artisans can readily envision the first [i)] and second [ii)] alternatives by removal of the other from the fluid line connector 112 in the figures.

Figure 10:
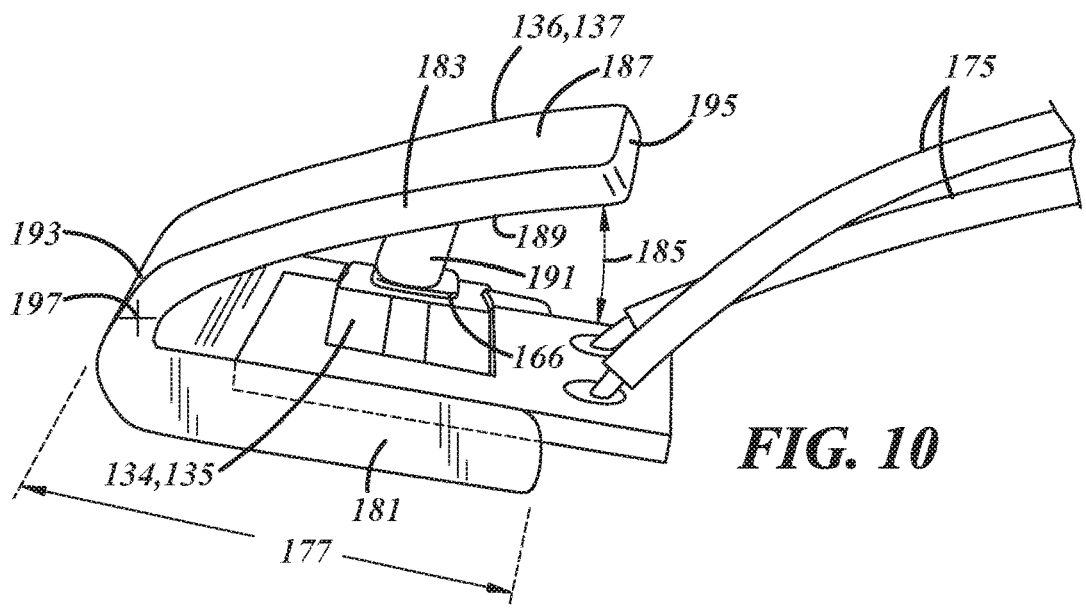
FIG. 10 is a side view of an embodiment of an actuator member and a switch that can be used with the fluid line connector of FIG. 5.

Turning now to FIG. 10, the first and second switches 134, 135 are electrically coupled with the RFID tag 132 in order to convey their state to the RFID tag 132 based on impingement or non-impingement of the switches 134, 135 by the first and second actuator members 136, 137. The electrical coupling can be in the form of wires 175 spanning from the first and second switches 134, 135 and to the RFID tag 132. The wiring can establish a series arrangement. In the example of the wires 175, the wires 175 could be routed through one or more grooves residing in the body 126 or could be embedded within the body's walls, among other possibilities. The first and second switches 134, 135 can take various forms in various embodiments depending in some cases upon the RFID tag that it interacts with and the design and construction of the accompanying actuator members. With respect to each other and in the embodiment in which both of the switches 134, 135 are present, the first and second switches 134, 135 can take different forms. In FIG. 10, the first and second switches 134, 135 are in the form of a button 166. When impinged and physically pressed by the particular actuator member, the button 166 is in a closed state. And when not impinged and not physically pressed by the particular actuator member, the button 166 is in an open state.

The first and second actuator members 136, 137 receive abutment amid full securement actions and at full securement between the fluid line connector 112 and the connector 114, and are thereby actuated and in turn respectively impinge the first and second switches 134, 135 to close the switches. The first and second actuator members 136, 137 can have various designs, constructions, and components in different embodiments depending in some cases upon the design and construction of the particular switch and connector. With respect to each other and in the embodiment in which both of the actuator members 136, 137 are present, the first and second actuator members 136, 137 can take different forms.

In the embodiment of the figures and turning now to FIGS. 5, 8, and 10, the first actuator member 136 is intended to facilitate detection of axial insertion of the connector 114 into the fluid line connector 112. The first actuator member 136 is situated near the entrance 163 of the passage 138. In general, the first actuator member 136 resembles a V-shape turned on its side. A longitudinal extent 177 of the first actuator member 136, in assembly, is arranged generally in-line with the direction of insertion 179 of the connector 114 into the fluid line connector 112. The longitudinal extent 177 is in general alignment with the axis of the passage 138 at the entrance 163. The first actuator member 136 has a base 181 and an appendage 183 depending from the base 181. The base 181 carries the first switch 134 and is inserted and received in the first socket 159 of the body 126. The appendage 183 can move relative to the base 181 over an arced path 185 when the first actuator member 136 receives abutment from the connector 114. The appendage 183, as demonstrated perhaps best by FIG. 5, is suspended partly within the passage 138 prior to insertion of the connector 114 so that the connector's extension 115 can make abutment with the appendage 183 upon such insertion. The appendage 183 remains in this extended and suspended position when it is at rest and when it lacks abutment from the extension 115—this constitutes an unactuated state of the first actuator member 136 and a correspondingly open state of the first switch 134. When abutted, the appendage 183 then moves toward the base 181 and impinges the first switch 134—this constitutes an actuated state of the first actuator member 136 and a correspondingly closed state of the first switch 134.

At one side, the appendage 183 has an outer working surface 187 that maintains general confrontation with the passage 138 and with the connector 114. At its opposite side, the appendage 183 has an inner working surface 189 that maintains general confrontation with the first switch 134. A projection 191 can extend from the inner working surface 189 for direct impingement with the first switch 134. The appendage 183 has a proximal end 193 about which the appendage 183 bends relative to the base 181, and has a distal end 195. The proximal end 193 serves as a hinge, and the distal end 195 constitutes a free terminal end of the appendage 183. For the first actuator member 136, an axis 197 of the hinge lies in a generally orthogonal arrangement with the direction of insertion 179 of the connector 114 into the fluid line connector 112, and likewise is generally orthogonal to the axis of the passage 138 at the entrance 163.

In this embodiment, the second actuator member 137 has a similar design and construction as the first actuator member 136. Turning now to FIG. 9, the second actuator member 137 is intended to facilitate detection of proper positioning of the retainer 129 and accompanying receipt of the legs 169, 171 in the slot 117. The second actuator member 137 is situated at a location that is external of the passage 138 and at a side of the body's wall; still, in other embodiments lacking depiction the second actuator member could be located internal of the body 126 and need not be external. Because of its location, and unlike the first actuator member 136, the longitudinal extent 177 of the second actuator member 137 is arranged generally transverse to the direction of insertion 179 of the connector 114 into the fluid line connector 112. The longitudinal extent 177 is generally orthogonal to the axis of the passage 138 at the entrance 163. The base 181 of the second actuator member 137 carries the second switch 135 and is inserted and received in the second socket 161 of the body 126. The appendage 183 is positioned at the body's exterior with its distal end 195 lying in intersection with a path over which the terminal foot 173 descends and resides when the retainer 129 is in its first and third positions of use. In this way, the terminal foot 173 can make abutment with the appendage 183 when the legs 169, 171 are moved in the slot 117 and can hence cause actuation of the second actuator member 137. Actuation of the second actuator member 137 via abutment from the terminal foot 173 is demonstrated in FIG. 9. The appendage 183 remains in its extended position when it is at rest and when it lacks abutment from the terminal foot 173—this constitutes an unactuated state of the second actuator member 137 and a correspondingly open state of the second switch 135. The appendage 183 lacks abutment from the terminal foot 173 when the retainer 129 is in its second position of use. When abutted by the terminal foot 173, the appendage 183 then moves toward the base 181 and impinges the second switch 135—this constitutes an actuated state of the second actuator member 137 and a correspondingly closed state of the second switch 135. For the second actuator member 137, the axis 197 of the hinge is arranged generally in-line with the direction of insertion 179 of the connector 114 into the fluid line connector 112, and likewise is in general alignment with the axis of the passage 138 at the entrance 163.

The embodiment of the fluid line connector 112 that employs the use of both of the switches 134, 135 and both of the actuator members 136, 137 provides an enhanced resolution of full securement and precludes a false-negative detection reading. Turning now to FIG. 6, a first bar schematic 200 is representative of the state of the first switch 134 at certain axial insertion depths of the connector 114 into the fluid line connector 112, and a second bar schematic 202 is representative of the state of the second switch 135 at the same axial insertion depths of the connector 114 into the fluid line connector 112. In FIG. 6, the first and second bar schematics 200, 202 are placed next to the connector 114 and parallel with the axis of the connector 114 to serve as a representation of the corresponding axial section of the connector 114 as it is inserted into the fluid line connector 112. In this embodiment, along a first axial depth of insertion 204 of the connector 114 into the fluid line connector 112, the first switch 134 should be in its open state. Along a first axial depth of insertion 206 of the connector 114 into the fluid line connector 112, the second switch 135 may be in its closed state. Further, along a second axial depth of insertion 208, the first switch 134 may be in its closed state. At the second axial depth of insertion 208, as illustrated, the retainer 129 has now come into engagement with the ramp 119. Along a second axial depth of insertion 210, the second switch 135 should be in its open state. Again here, the ramp 119 is engaging the retainer 129 in the second axial depth of insertion 210. Lastly, along a third axial depth of insertion 212, the first switch 134 should be in its closed state. And along a third axial depth of insertion 214, the second switch 135 should also be in its closed state. At the third axial depth of insertions 212, 214, the first and second legs 169, 171 are received in the slot 117 and the fluid line connector 112 and the connector 114 are fully secured together. Also, the first and second actuator members 136, 137 are actuated and impinge the first and second switches 134, 135 at the third axial depth of insertions 212, 214. Over insertion movement of the connector 114 into the fluid line connector 112, in this embodiment the first switch 134 goes from its open state to its closed state, and the second switch 135 goes from its closed state to its open state and then back to its closed state. The second switch 135, in a sense, acts like a momentary switch. Moreover, because at the time when the first switch 134 initially enters its closed state (or at least may be in its closed state) at the second axial depth of insertion 208 the second switch 135 is concurrently in its open state at the second axial depth of insertion 210, a false-negative detection reading is precluded. Put another way, at least one of the first or second switches 134, 135 remains in its open state until the third axial depth of insertions 212, 214.

Still, additional alternatives are possible for the embodiment of FIGS. 5-11. In one alternative, impingement from the first and second actuator members 136, 137 changes the state of the respective first and second switches 134, 135—for example, brings the switches from an initially open state to a subsequently closed state via impingement, or conversely brings the switches from an initially closed state to a subsequently open state via impingement. In another alternative, the first switch 134 can itself receive abutment from the connector 114, with the first actuator member 136 being indirectly acted on and indirectly moved by the abutment via the first switch 134.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A fluid line connector, comprising:
a body having a passage;
a radio-frequency identification (RFID) tag carried by said body;
an actuator member situated adjacent said passage of said body, said actuator member acted on upon insertion of a discrete connector into the fluid line connector; and
a switch electrically coupled with said RFID tag and situated adjacent said actuator member, said switch changing its state upon insertion of the discrete connector into the fluid line connector;
wherein said actuator member has a longitudinal extent, said longitudinal extent arranged generally in-line with a direction of insertion of the discrete connector into the fluid line connector, wherein said actuator member has an outer working surface residing in said passage of said body, and upon insertion of the discrete connector into the fluid line connector the discrete connector makes abutment with said outer working surface to actuate said actuator member.

2. The fluid line connector of claim 1, wherein, upon insertion of the discrete connector into the fluid line connector, abutment from the discrete connector actuates said actuator member, and said switch is impinged by said actuator member when actuated and the state of said switch changes.

3. The fluid line connector of claim 2, wherein said switch is brought to a closed state when said actuator member is actuated and said switch is impinged.

4. The fluid line connector of claim 1, wherein a socket resides in said body adjacent said passage, said actuator member is received in said socket and held therein.

5. The fluid line connector of claim 1, wherein said actuator member lacks actuation when insertion of the discrete connector into the fluid line connector is absent, and the state of said switch remains unchanged when said actuator member lacks actuation.

6. The fluid line connector of claim 1, wherein said actuator member has a base, and said base carries said switch.

7. The fluid line connector of claim 1, wherein said actuator member has a base and an appendage depending from said base, said appendage moving relative to said base when said actuator member is being actuated.

8. The fluid line connector of claim 1, wherein said actuator member has an appendage with a proximal end that is hinged and a distal end that terminates freely, said appendage moving about said proximal end when said actuator member is being actuated.

9. The fluid line connector of claim 1, wherein said actuator member has an appendage with a hinged end, said hinged end has an axis about which said appendage moves when said actuator member is being actuated, said axis is arranged generally orthogonal to a direction of insertion of the discrete connector into the fluid line connector.

10. The fluid line connector of claim 1, wherein said actuator member has an inner working surface in general confrontation with said switch, said inner working surface making surface-to-surface impingement with said switch when said actuator member is acted on upon insertion of the discrete connector into the fluid line connector.

11. The fluid line connector of claim 1, wherein said switch is a button.

12. The fluid line connector of claim 1, further comprising:
a retainer carried by said body;
a second actuator member situated adjacent said retainer, said second actuator member actuating upon movement of said retainer in a direction that is transverse to a direction of insertion of the discrete connector into the fluid line connector; and a second switch electrically coupled with said RFID tag and situated adjacent said second actuator member, said second switch impinged by said second actuator member when said second actuator member is actuated.

13. A fluid line connector assembly comprising the fluid line connector of claim 1, and comprising an RFID interrogator that communicates with said RFID tag of the fluid line connector, and further comprising the discrete connector.

14. A fluid line connector, comprising:
a body having a passage, an opening residing in said body and leading to said passage;
a radio-frequency identification (RFID) tag carried by said body;
a retainer moveable through said opening of said body;
an actuator member situated adjacent said retainer, said actuator member actuating upon movement of said retainer through said opening and abutment from said retainer; and
a switch electrically coupled with said RFID tag and situated adjacent said actuator member, said switch impinged by said actuator member when said actuator member is actuated
wherein said retainer has a pair of legs, one of said pair of legs making abutment with said actuator member to actuate said actuator member.

15. The fluid line connector of claim 14, wherein said retainer maintains abutment with said actuator member and said actuator member remains actuated prior to insertion of a discrete connector into the fluid line connector, said retainer lacks abutment with said actuator member and said actuator member lacks actuation when a ramp of the discrete connector engages said retainer, and said retainer subsequently abuts said actuator member and said actuator member actuates when said retainer is received in a slot of the discrete connector.

16. The fluid line connector of claim 14, wherein a socket resides in said body, said actuator member is received in said socket and held therein.

17. The fluid line connector of claim 14, wherein said actuator member has an outer working surface, and upon movement of said retainer through said opening of said body said retainer makes abutment with said outer working surface to actuate said actuator member.

18. The fluid line connector of claim 14, wherein said actuator member has a base, and said base carries said switch.

19. The fluid line connector of claim 14, wherein said actuator member has a longitudinal extent, said longitudinal extent arranged generally transverse to a direction of insertion of a discrete connector into the fluid line connector.

20. The fluid line connector of claim 14, wherein said actuator member has a base and an appendage depending from said base, said appendage moving relative to said base when said actuator member is in the midst of being actuated.

21. The fluid line connector of claim 14, wherein said actuator member has an appendage with a proximal end that is hinged and a distal end that terminates freely, said appendage moving about said proximal end when said actuator member is in the midst of being actuated.

22. The fluid line connector of claim 14, wherein said actuator member has an appendage with a hinged end, said hinged end has an axis about which said appendage moves when said actuator member is in the midst of being actuated, said axis is arranged generally in-line with a direction of insertion of a discrete connector into the fluid line connector.

23. The fluid line connector of claim 14, wherein said actuator member has an inner working surface in general confrontation with said switch, said inner working surface making surface-to-surface impingement with said switch when said actuator member is actuated.

24. The fluid line connector of claim 14, wherein said switch is a button.

25. The fluid line connector of claim 14, further comprising:
a second actuator member situated adjacent said passage of said body, said second actuator member being actuated upon insertion of a discrete connector into the fluid line connector, abutment from the discrete connector actuating said second actuator member; and
a second switch electrically coupled with said RFID tag and situated adjacent said second actuator member, said second switch is impinged by said second actuator member when said second actuator member is actuated.

26. A fluid line connector assembly comprising the fluid line connector of claim 14, and comprising an RFID interrogator that communicates with said RFID tag of the fluid line connector.

27. A fluid line connector, comprising:
a body having a passage;
a radio-frequency identification (RFID) tag carried by said body;
a retainer carried by said body, said retainer receivable in a slot of a discrete connector upon insertion of the discrete connector into the fluid line connector;
a first actuator member situated adjacent said passage of said body, abutment from the discrete connector upon insertion of the discrete connector into the fluid line connector actuating said first actuator member;
a first switch electrically coupled with said RFID tag, said first switch changing its state when said first actuator member is actuated;
a second actuator member situated adjacent said retainer, abutment from said retainer upon movement of said retainer in a direction that is transverse to a direction of insertion of the discrete connector into the fluid line connector actuating said second actuator member; and
a second switch electrically coupled with said RFID tag, said second switch changing its state when said second actuator member is actuated.

28. The fluid line connector of claim 27, wherein said first actuator member impinges said first switch upon its actuation, and said second actuator member impinges said second switch upon its actuation.

29. The fluid line connector of claim 27, wherein at least one of said first actuator member or said second actuator member has a base and an appendage depending from said base, said appendage moving relative to said base when said at least one first or second actuator member is in the midst of being actuated.

30. The fluid line connector of claim 27, wherein said first actuator member has a first longitudinal extent and said second actuator member has a second longitudinal extent, said first longitudinal extent arranged generally transverse to said second longitudinal extent.

31. A fluid line connector assembly comprising the fluid line connector of claim 27, and comprising an RFID interrogator that communicates with said RFID tag of the fluid line connector.

32. A fluid line connector, comprising:
a body having a passage;
a radio-frequency identification (RFID) tag carried by said body;
a retainer carried by said body;

an actuator member situated adjacent said retainer, said actuator member actuating upon movement of said retainer in a direction that is transverse to a direction of insertion of a discrete connector into the fluid line connector, said actuator member having an outer working surface, and upon movement of said retainer in the direction that is transverse to the direction of insertion of the discrete connector, said retainer makes abutment with said outer working surface; and a switch electrically coupled with said RFID tag and situated adjacent said actuator member, said switch changing its state when said actuator member is actuated.

33. A fluid line connector, comprising:

a body having a passage;

a radio-frequency identification (RFID) tag located at said body;

an actuator member situated adjacent said passage of said body, said actuator member acted on upon insertion of a discrete connector into the fluid line connector, said actuator member having an appendage with a hinged end, said hinged end having an axis about which said appendage moves when said actuator member is actuated, said axis being arranged generally orthogonal to a direction of insertion of the discrete connector into the fluid line connector, said actuator member having an outer working surface residing in said passage of said body, and upon insertion of the discrete connector into the fluid line connector the discrete connector makes abutment with said outer working surface to actuate said actuator member; and a switch electrically coupled with said RFID tag and situated adjacent said actuator member, said switch changing its state upon insertion of the discrete connector into the fluid line connector.

* * * * *